United States Patent [19]
Anderson

[11] Patent Number: 5,899,248
[45] Date of Patent: May 4, 1999

[54] MATERIAL DISPENSER

[76] Inventor: Craig Jamieson Anderson, 2243 128th Street, South Surrey, B.C., Canada, V4E 3V8

[21] Appl. No.: 08/886,366

[22] Filed: Jul. 1, 1997

Related U.S. Application Data

[63] Continuation-in-part of application No. 08/553,916, Nov. 6, 1995, Pat. No. 5,642,762.

[51] Int. Cl.$^6$ ...................................................... B65B 1/00
[52] U.S. Cl. .......................... 141/358; 141/362; 222/226
[58] Field of Search .................................... 141/351, 353, 141/354, 358, 360, 362; 222/226, 227

[56] References Cited

U.S. PATENT DOCUMENTS

| | | | |
|---|---|---|---|
| 465,090 | 12/1891 | Willson | 141/358 |
| 694,237 | 2/1902 | Bernhard | 141/358 |
| 731,577 | 6/1903 | Kinnard | 141/358 |
| 947,507 | 1/1910 | Westerbeck | 141/358 |
| 2,065,983 | 12/1936 | Reid | 141/358 |
| 2,753,089 | 7/1956 | Phillips | 222/227 |
| 2,794,577 | 6/1957 | Leeuwen | 222/227 |
| 2,903,024 | 9/1959 | Lohse | 141/358 |
| 3,251,512 | 5/1966 | Irving | 222/227 |
| 4,130,149 | 12/1978 | Hausam | 141/358 |
| 4,166,487 | 9/1979 | Spies | 141/358 |
| 4,232,718 | 11/1980 | Wippermann | 141/358 |
| 4,287,921 | 9/1981 | Sanford | 141/360 |
| 4,421,147 | 12/1983 | Cannella | 141/362 |
| 4,796,440 | 1/1989 | Shiotani et al. | 222/227 |
| 5,086,818 | 2/1992 | Bendt | 141/358 |
| 5,236,022 | 8/1993 | Husted | 141/358 |

Primary Examiner—J. Casimer Jacyna

[57] ABSTRACT

A dispenser for supplying a predetermined amount of bulk material into a measuring cup. The inventive device includes a container having a dispensing aperture directed through a lower surface thereof. A valve plate is movably mounted within a channel extending along the lower surface of the container and covers the aperture. A measuring cup is positionable into the channel to bias the valve plate from over the aperture to dispense material from the container into the cup. The addition of various attachments will convert the dispenser into a versatile tool capable of containing, sealing and controlling the distribution of several types of mediums.

6 Claims, 17 Drawing Sheets

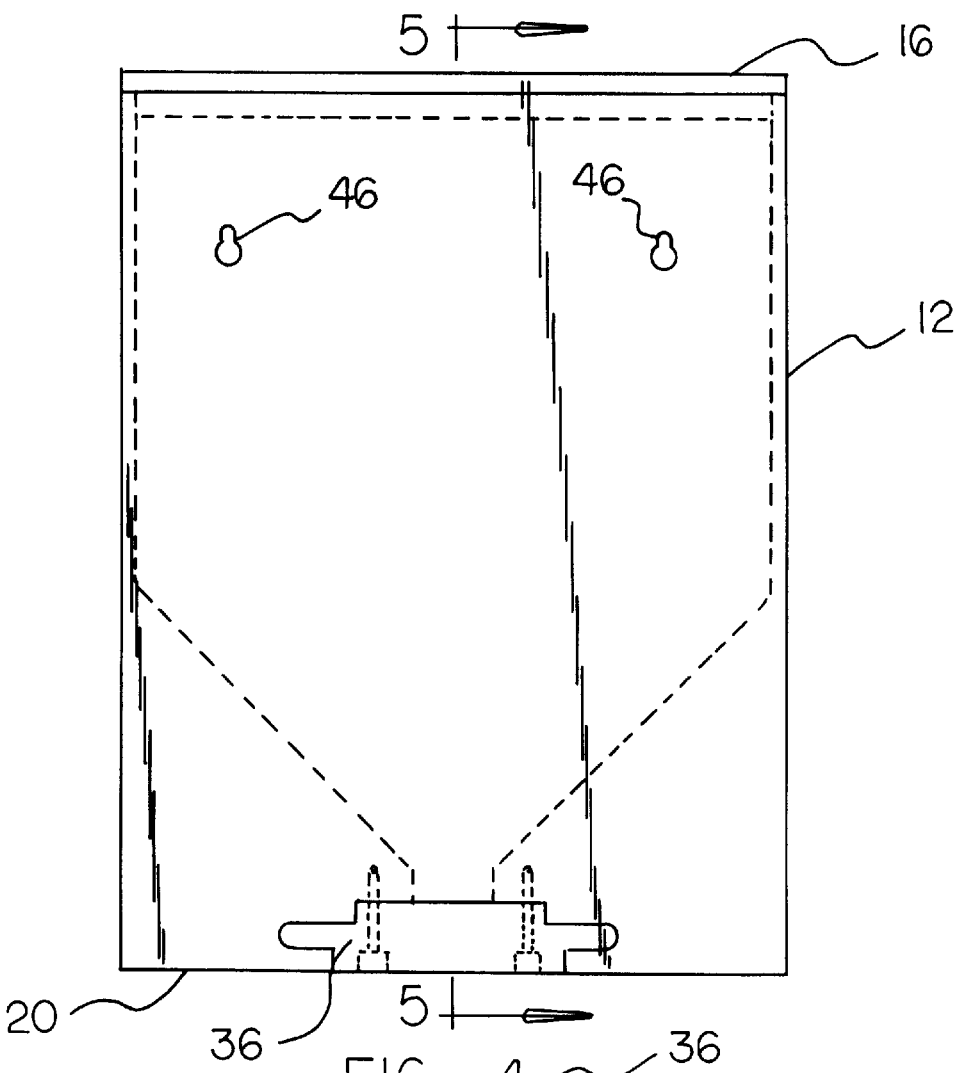

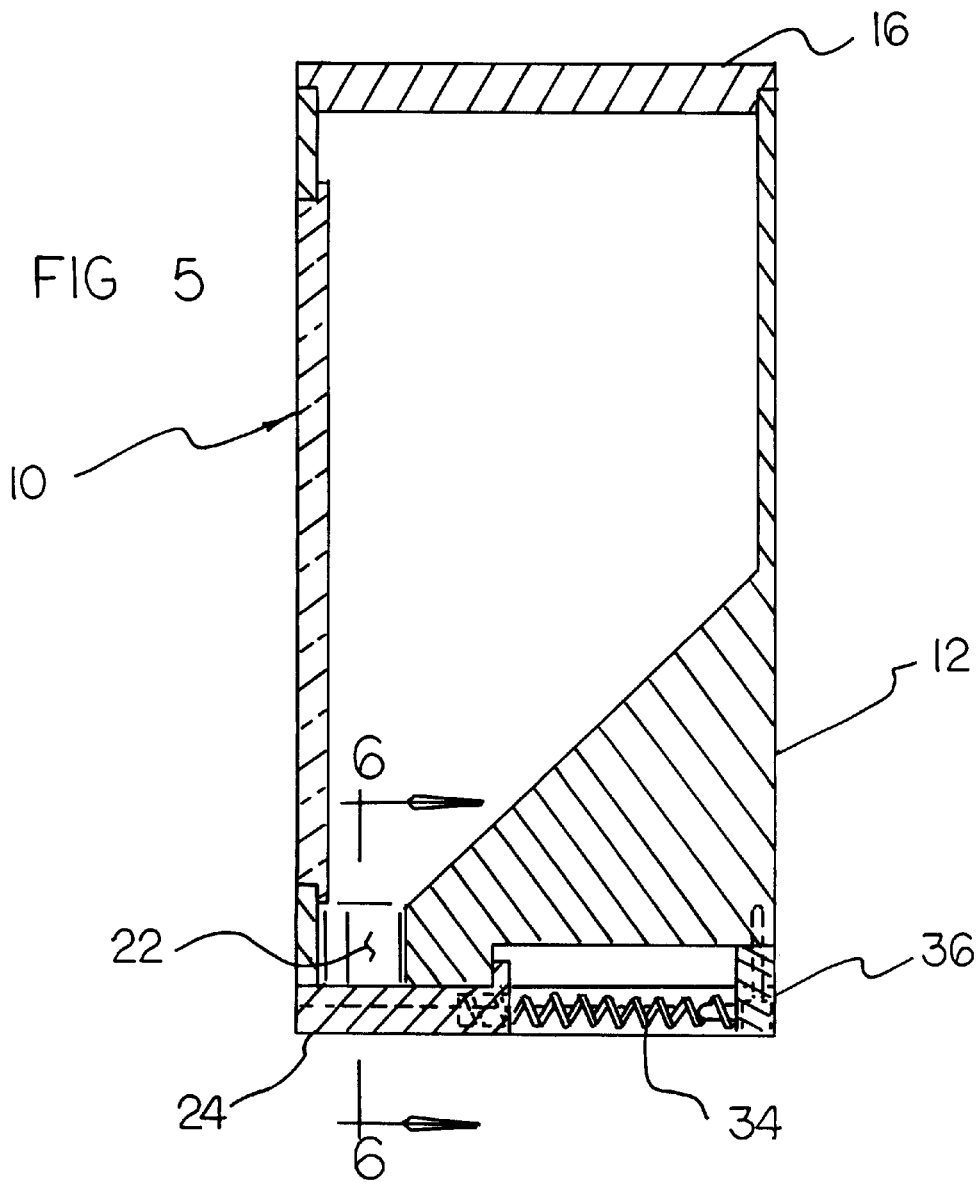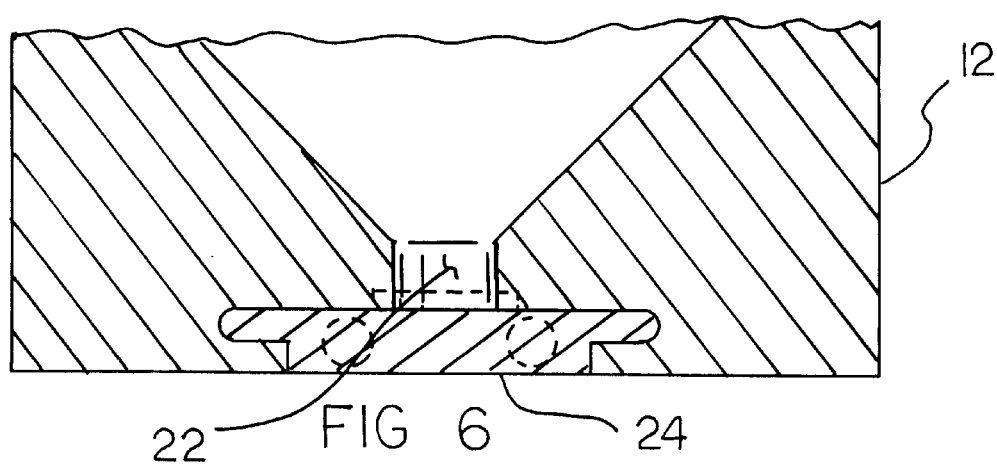

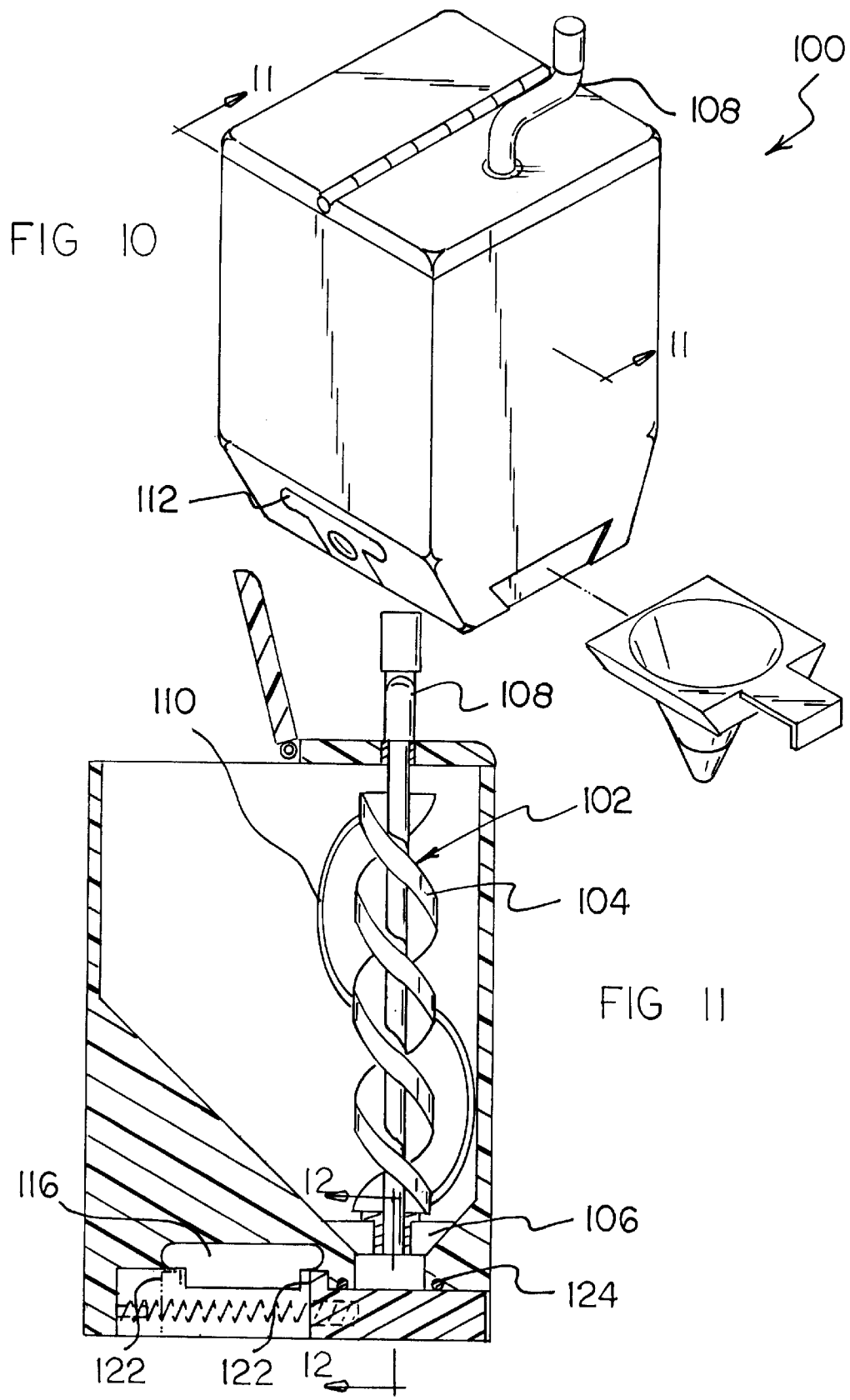

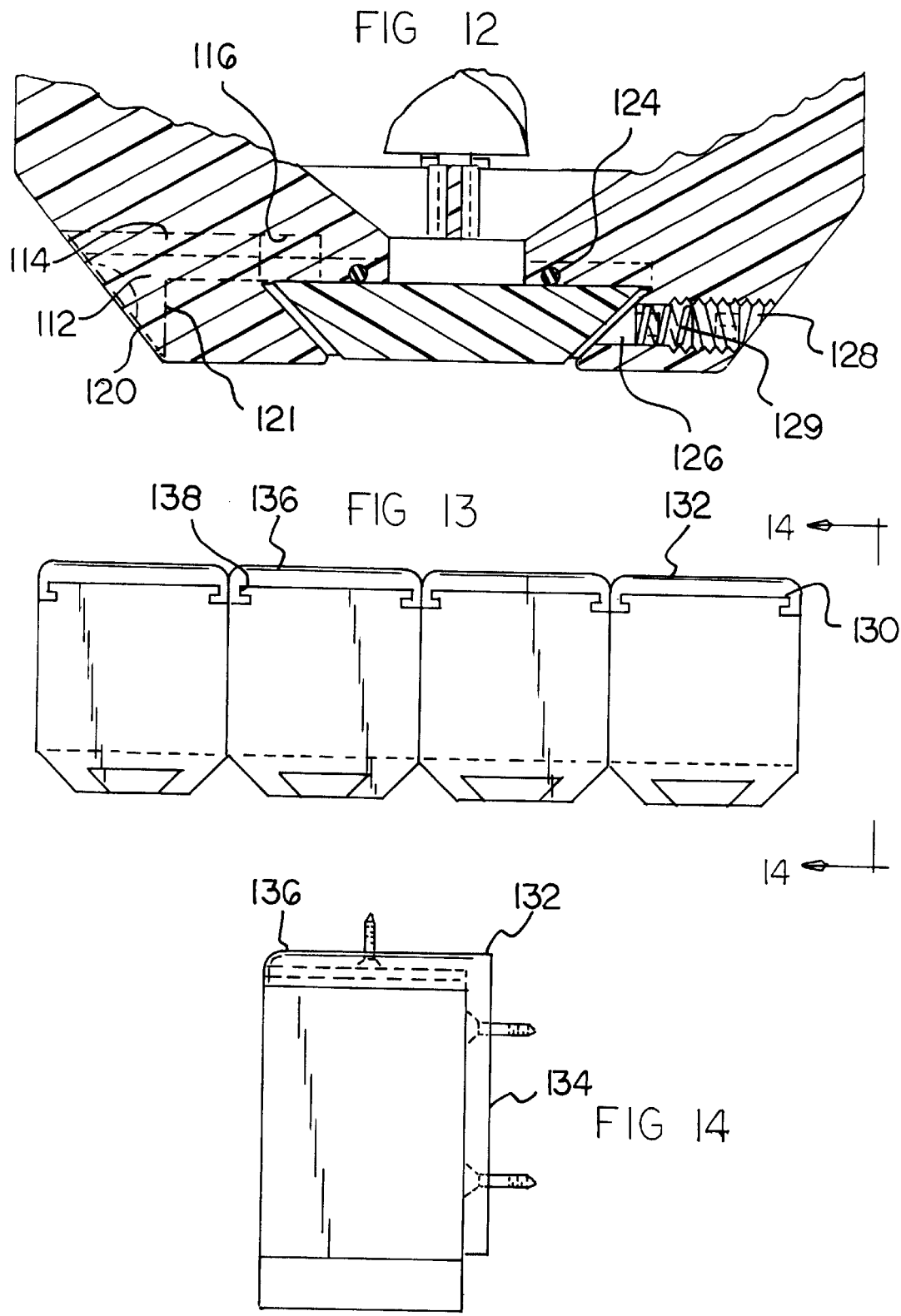

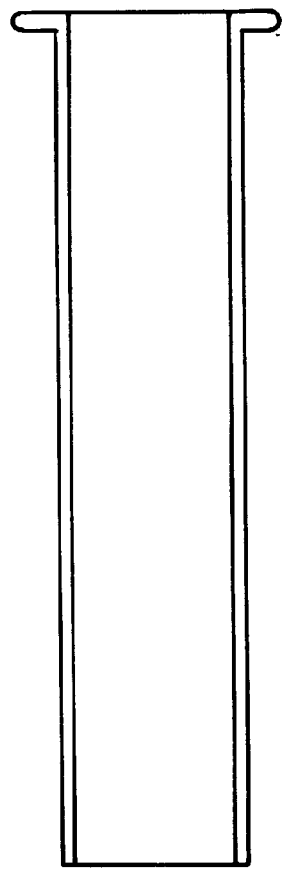
FIG 15
FIG 16
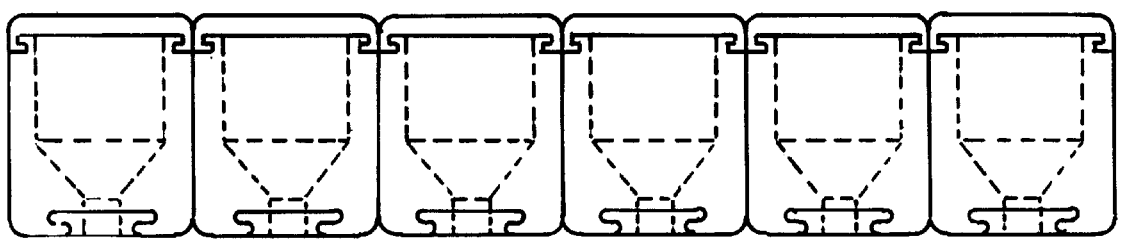

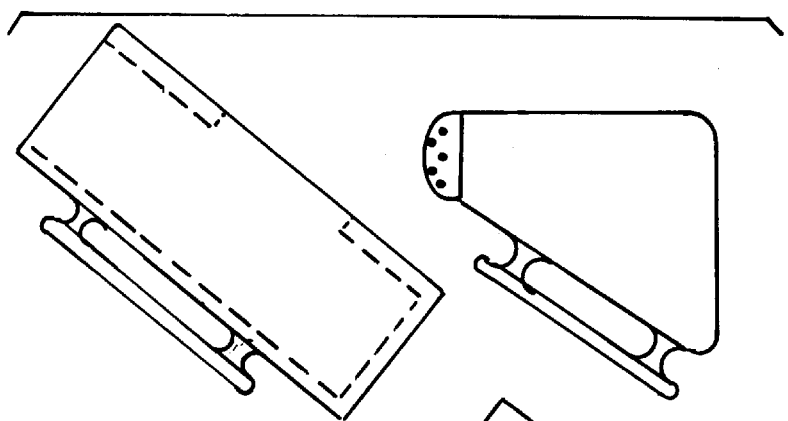
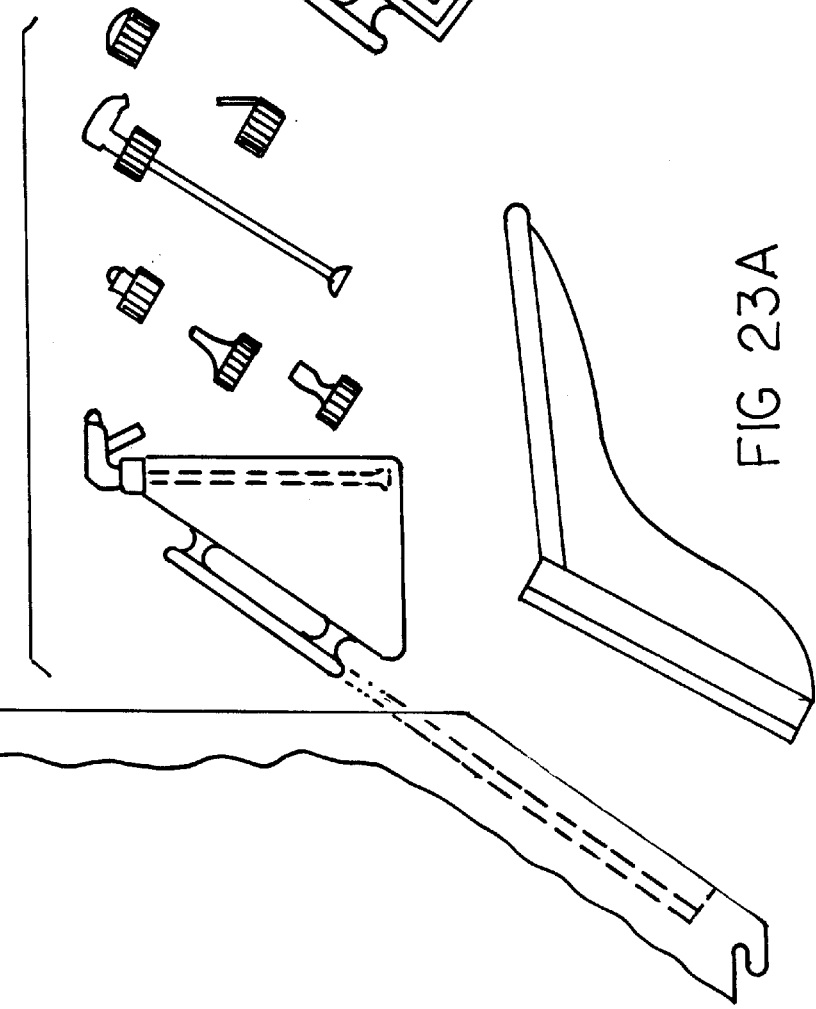
FIG 23
FIG 23A
FIG 23B

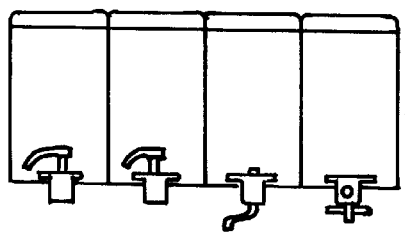 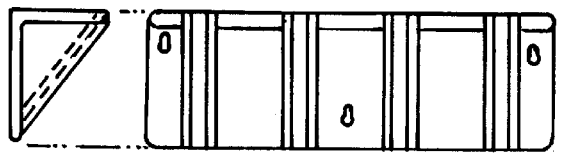
FIG 24 A　　　　　FIG 24
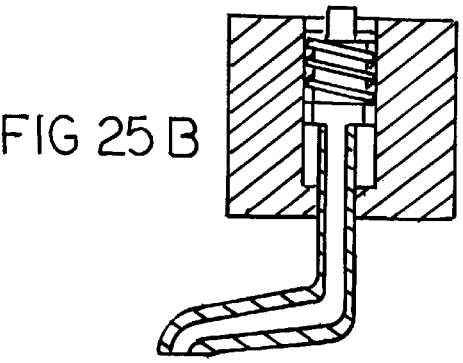
FIG 25 B
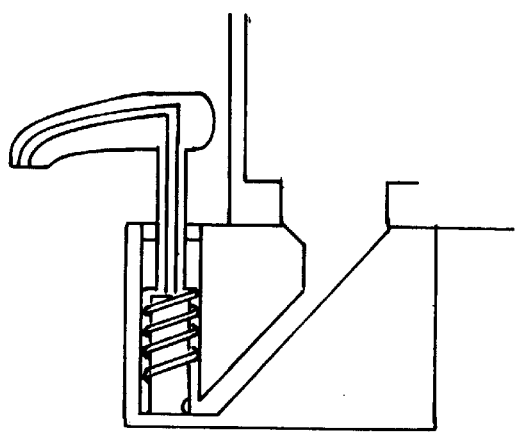 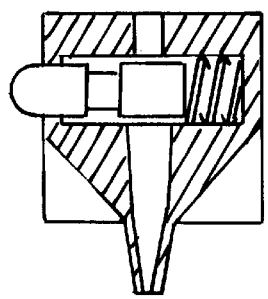
FIG 25A　　　　　FIG 25

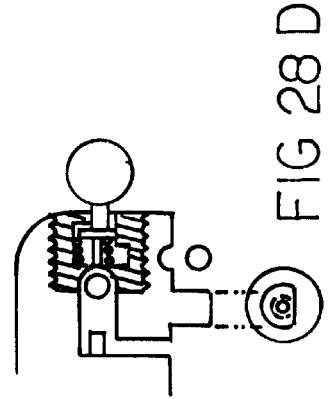
FIG 28 D
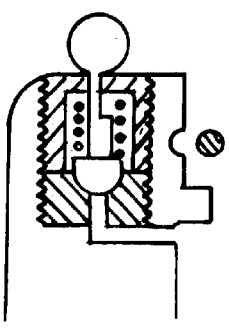
FIG 28 C
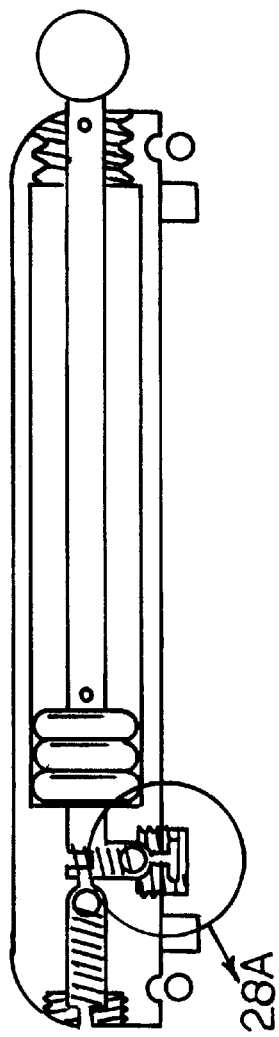
FIG 28E
FIG 28
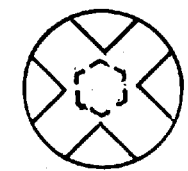
FIG 28 B
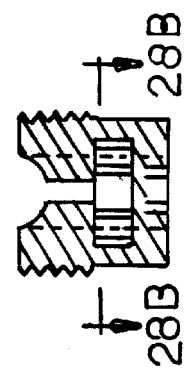
FIG 28 A

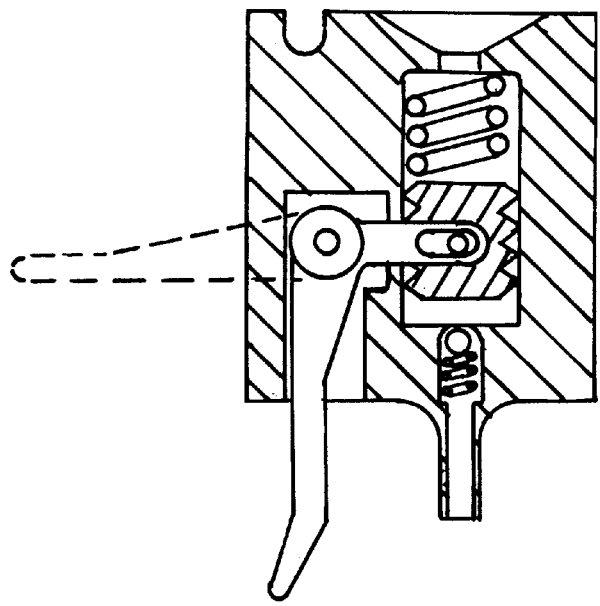
FIG 29
FIG 30
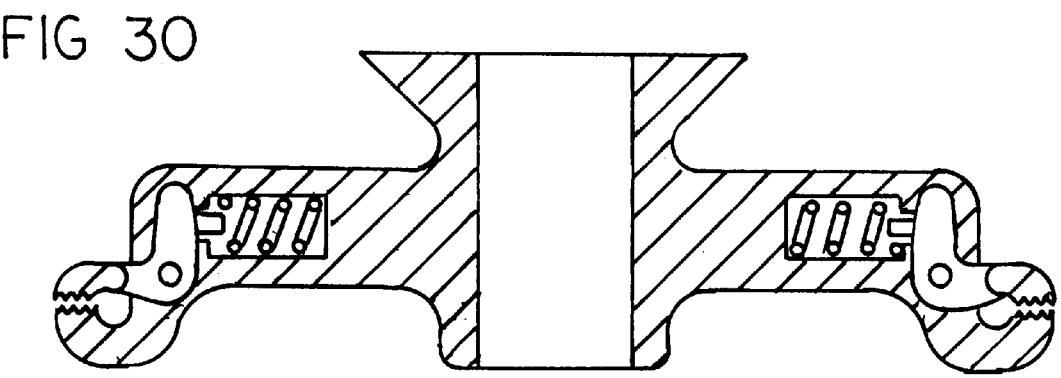
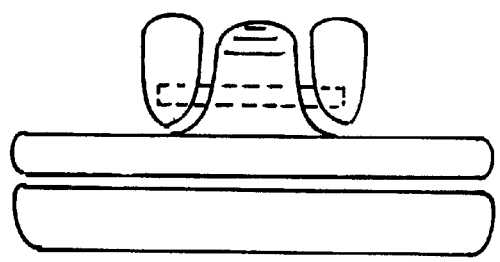
FIG 30A 5,899,248

MATERIAL DISPENSER

BACKGROUND OF THE INVENTION

1. Related Application

The present application is a continuation-in-part application of a parent application filed Nov. 6, 1995 under Ser. No. 08/553,916 now U.S. Pat. No. 5,642,762.

2. Field of the Invention

The present invention relates to particulate material dispensers and previously pertains to a laundry soap dispenser for supplying a predetermined amount of material into a measuring cup. The present invention, with the addition of a variety of attachments, provides a dispenser with the ability to distribute particulate to viscous mediums.

3. Description of the Prior Art

The use of particulate material dispensers is known in the prior art. More specifically, particulate material dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art particulate material dispensers include U.S. Pat. No. 4,448,334; U.S. Pat. No. 5,332,014; U.S. Pat. No. 5,082,148; U.S. Pat. No. 4,598,844; U.S. Pat. No. Design 341,974; and U.S. Pat. No. Design 327,429.

While these devices fulfill their respective, particular objectives and requirements, the aforementioned patents do not disclose a material dispenser for supplying predetermined amount of material into a measuring cup which includes a container having a dispensing aperture directed through a lower surface thereof, a valve plate movably mounted within a channel extending along the lower surface of the container and covering the aperture, and a measuring cup positionable into the channel to bias the valve plate from over the aperture to dispense material from the container into the cup, or that is capable of a variety of other abilities that the present invention is capable of performing.

In these respects, the material dispenser according to the present invention substantially departs from the conventional concepts and designs of the prior art, and in so doing provides an apparatus primarily developed for the purpose of supplying a predetermined amount of material into a measuring cup or desired attachments.

SUMMARY OF THE INVENTION

In view of the foregoing disadvantages inherent in the known types of particulate material dispensers now present in the prior art, the present invention provides a new material dispenser construction wherein the same can be utilized for supplying a predetermined amount of material into a measuring cup. As such, the general purpose of the present invention, which will be described subsequently in greater detail, is to provide a new material dispenser apparatus and method which has many of the advantages of the particulate material dispensers mentioned heretofore and many novel features that result in a material dispenser which is not anticipated, rendered obvious, suggested, or even implied by any of the prior art particulate material dispensers, either alone or in any combination thereof.

To attain this, the present invention generally comprises a dispenser for supplying a predetermined amount of material into a measuring cup. The inventive device includes a container having a dispensing aperture directed through a lower surface thereof. A valve plate is movably mounted within a channel extending along the lower surface of the container and covers the aperture. A measuring cup is positionable into the channel to bias the valve plate from over the aperture to dispense material from the container into the cup.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new material dispenser apparatus and method which has many of the advantages of the particulate material dispensers mentioned heretofore and many novel features that result in a material dispenser which is not anticipated, rendered obvious, suggested, or even implied by any of the prior art tool guides, either alone or in any combination thereof.

It is another object of the present invention to provide a new material dispenser which may be easily and efficiently manufactured and marketed.

It is a further object of the present invention to provide a new material dispenser which is of a durable and reliable construction.

An even further object of the present invention is to provide a new material dispenser which is susceptible of a low cost of manufacture with regard to both materials and labor, and which accordingly is then susceptible of low prices of sale to the consuming public, thereby making such material dispensers economically available to the buying public.

Still yet another object of the present invention is to provide a new material dispenser which provides in the apparatuses and methods of the prior art some of the advantages thereof, while simultaneously overcoming some of the disadvantages normally associated therewith.

Still another object of the present invention is to provide a new material dispenser for supplying a predetermined amount of material into a measuring cup.

Yet another object of the present invention is to provide a new material dispenser which includes a container having a dispensing aperture directed through a lower surface thereof, a valve plate movably mounted within a channel extending along the lower surface of the container and covering the aperture, and a measuring cup positionable into the channel to bias the valve plate from over the aperture to dispense material from the container into the cup.

Yet another object of the present invention is to provide a new material dispenser that provides a contamination-free, sealed environment that contains, controls and distributes several types of bulk mediums in an environmentally friendly way. From foodstuffs to cleaning materials, and so on, the present invention can dispense into refillable, reusable and replaceable bottles, etc., thus eliminating the need for some waste byproduct packaging. The present invention can be used in the home, workplace, and grocery stores wherever bulk material goods distribution is evident.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear elevation view thereof.

FIG. 4 is a bottom plan view of the invention.

FIG. 5 is a cross sectional view taken along line 5—5 of FIG. 3.

FIG. 6 is a cross sectional view taken along line 6—6 of FIG. 5.

FIG. 10 is a perspective view of an alternate embodiment of the present invention.

FIG. 11 is a cross-sectional view of the alternate embodiment taken along line 11—11 shown in FIG. 10.

FIG. 12 is a close-up cross-sectional view of the alternate embodiment taken along line 12—12 shown in FIG. 11.

FIG. 13 is a front view of yet another alternate embodiment of the present invention.

FIG. 14 is a side view of the alternate embodiment shown in FIG. 13.

FIG. 15 is a side cross-sectional view of a flexible tube for directing flow from the container into various basins located at floor level.

FIG. 16 is an illustration of the various containers connected in a side-by-side relationship for containing and dispensing various household food products and the like.

FIG. 17-A shows an open cup bottom for fast filling.

FIG. 17-B illustrates a locking location pin hole.

FIG. 18-A is a sectional view of the spoon of FIG. 18.

FIG. 18-B shows a pepper grinder or bean grinder.

FIG. 19-A shows a drain cock.

FIG. 19-B shows a funnel and hose.

FIG. 23 is an exploded view of various removable tops for dispensing material from the bottle of FIG. 22. Also shown in FIG. 23 is a paper towel rack, tissue holder and a salt/pepper shaker which are also equipped with a T-shaped handle for being removably coupled with the foregoing T-shaped grooves.

FIG. 24 is a wall-mounted accessory hanger for hanging bottles and the like.

FIG. 24A is a front view of the mounted assembly with a plurality of unique dispensing assemblies coupled thereto.

FIG. 25 is a cross-sectional view of a first one a plurality of examples of the dispensing assemblies of the present invention.

FIG. 25A is a cross-sectional view of a second one of the dispensing assemblies of the present invention.

FIG. 25B is a cross-sectional view of a third one of the dispensing assemblies of the present invention.

FIG. 26-A shows a low-viscous orifice reducer.

FIG. 26-B shows a ball valve with cup which can be used in conjunction with other attachments and adapters.

FIG. 26-C shows a threaded adapter for use with liquid valves, pipes, hoses, etc.

FIG. 28 shows a pump for an airtight system.

FIG. 28-A is a particle trap on the left side of the pump.

FIG. 28-B is a plan view of the trap.

FIG. 28-C is a first air-release system.

FIG. 28-D is a second air-release system.

FIG. 28-E shows the air-release and pump locations.

FIG. 29 is a cross-sectional view of a medium viscous pump and valve, a home-helper adapter, with a centrally-located opening at the top of the orifice and with a lock and locating pin hole thereadjacent.

FIG. 30 shows a bag hanger adapter with spring-loaded clamps and a dovetail flange with thumb tabs.

FIG. 30-A shows an end view of the bag hanger adapter.

FIG. 31-A shows a large particle valve as for coffee beans and the like.

DESCRIPTION OF THE PREFERRED EMBODIMENT

Figure 1:
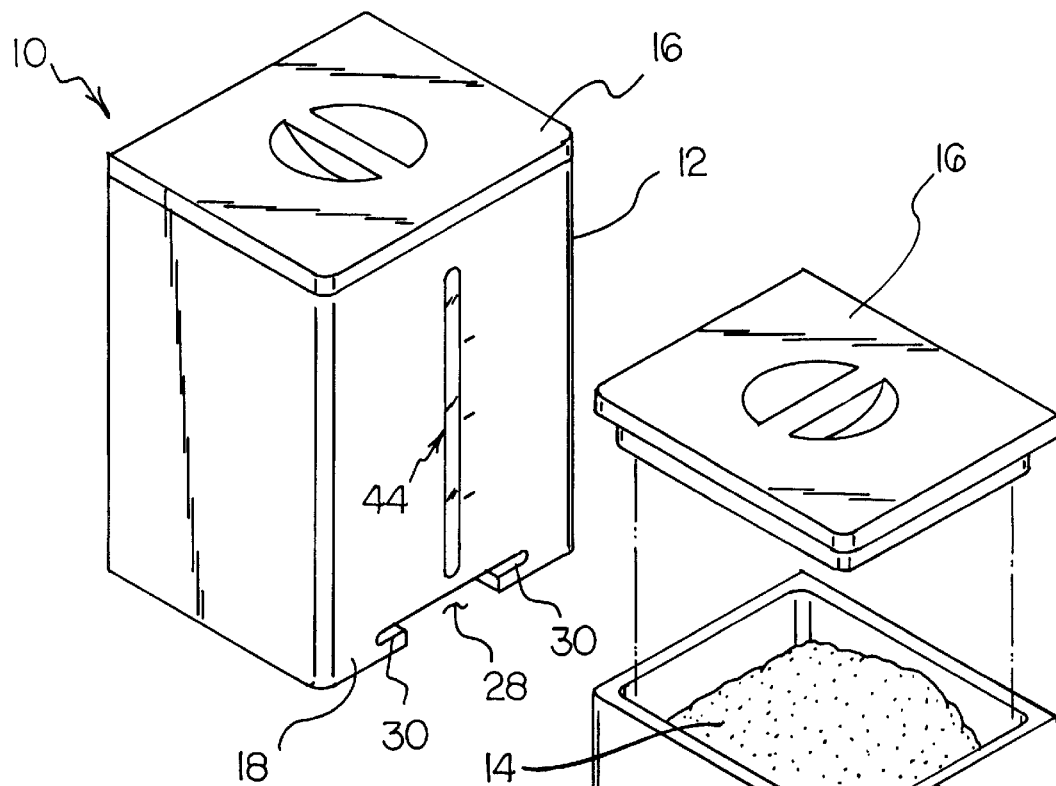
FIG. 1 is an isometric illustration of a laundry soap dispenser according to the present invention.

With reference now to the drawings, and in particular to FIGS. 1–9 thereof, a new material dispenser embodying the principles and concepts of the present invention and generally designated by the reference numeral 10 will be described.

Figure 2:
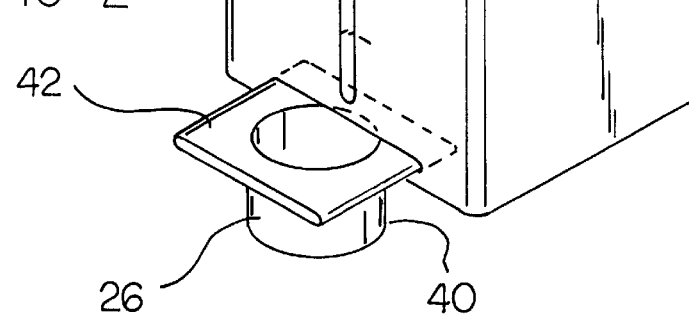
FIG. 2 is an exploded isometric illustration of the invention.
Figure 7:
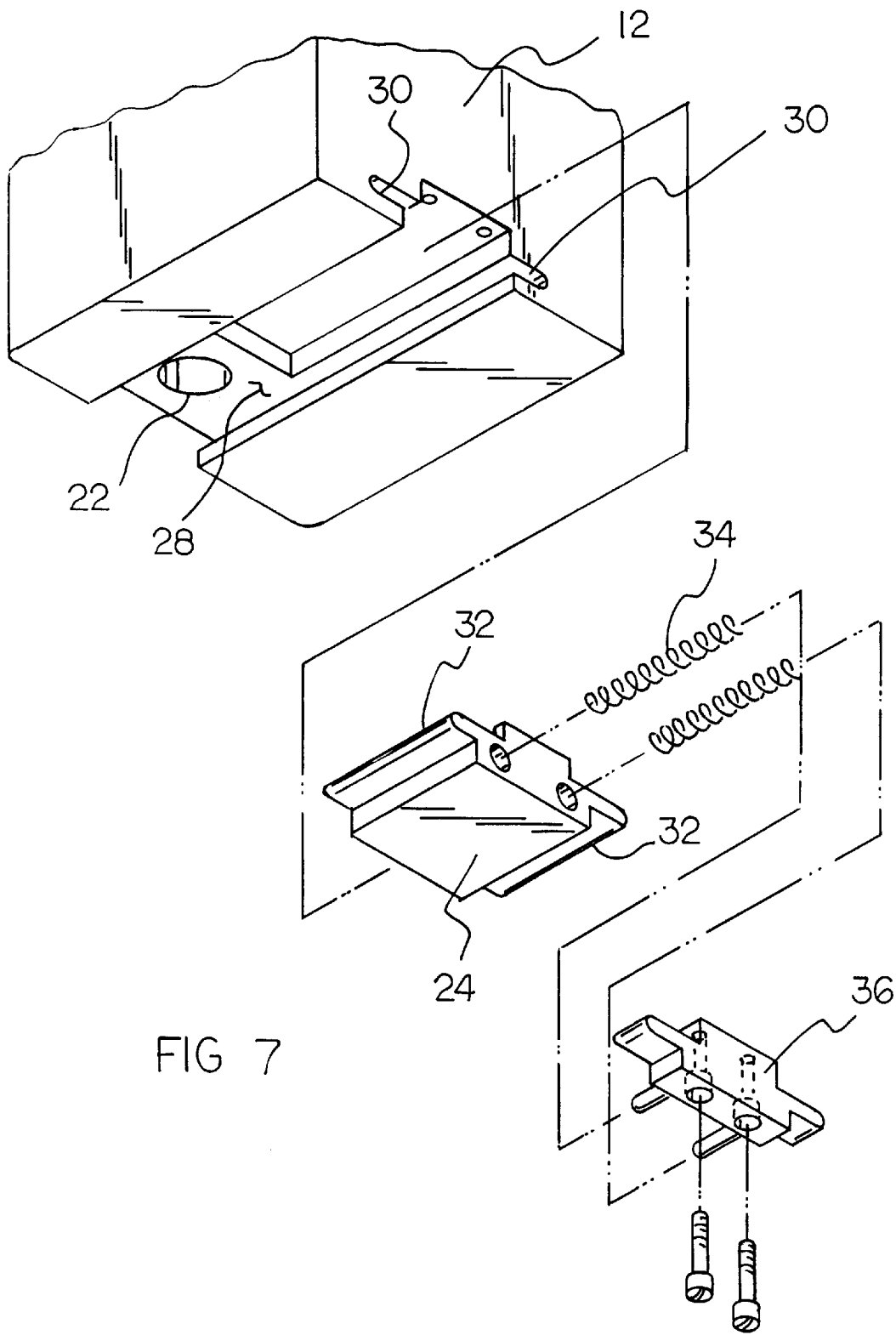
FIG. 7 is an exploded isometric illustration of a portion of the present invention.

More specifically, it will be noted that the material dispenser 10 comprises a container 12 having a hollow interior within which a particulate material 14 can be positioned substantially as shown in FIGS. 1 and 2 of the drawings. A lid 16 is removably coupled to an open upper end of the container 12 and facilitates access to an interior thereof for maintaining the supply of detergent 14 therein. Lid 16 designs may consist of a hinge and may be sealed by O-ring and groove. Storage recesses may be added to lid 16 and lower areas of container 12 where excess plastic exists. The container 12 includes a front wall 18 and a lower surface 20 which are preferably orthogonally oriented substantially as shown in FIGS. 1 and 3 of the drawings. A dispensing aperture 22 is directed through the lower surface 20 of the container 12 and into fluid communication with an interior thereof such that material 14 can pass through the dispensing aperture 22 when opened. A valve plate 24 is movably mounted to the lower surface 20 of the container 12 and is normally positioned over the dispensing aperture 22 so as to preclude fluid communication therethrough. A measuring cup 26 can be abuttingly engaged with the valve plate 24 so as to bias the valve plate 24 from over the dispensing aperture 22 to permit material 14 to flow from the interior of the container 12 through the dispensing aperture 22 and into the measuring cup 26. By this structure, a predetermined amount of material 14 can be dispensed into the measuring cup 26 for subsequent placement into a desired location.

Referring now to FIGS. 1 through 7 wherein the present invention 10 is illustrated in detail, it can be shown that the container 12 is preferably shaped so as to define a central channel 28 extending through the front wall 18 thereof and along the lower surface of the container over the dispensing aperture 22. The valve plate 24 is movably mounted within the central channel 28 over the dispensing aperture 22 substantially as shown in FIGS. 4 and 5 of the drawings. To this end, the container 12 is preferably further shaped so as to define a pair of flange channels 30 extending from respectively opposed longitudinal sides of the central channel 28. The valve plate 24 is correspondingly shaped so as to define valve plate flanges 32 projecting from respectively opposed sides thereof which are slidably received within the flange channels 30 of the container 12 so as to movably mount the valve plate 24 over the dispensing aperture 22. To position the valve plate 24 in the normal orientation over the dispensing aperture 22, at least one spring 34 engages the valve plate 24 and is interposed between the valve plate and an abutment plate 36 secured to the container 12 by threaded fasteners or the like directed therethrough. By this structure, the measuring cup 26 can be abuttingly engaged to the valve plate 24 so as to bias the valve plate through the central channel 28 against a force of the spring 34 to uncover the dispensing aperture 22 and allow material 14 to flow from an interior of the container 12 through the dispensing aperture and into the measuring cup.

Referring now to specifically to FIG. 2, it can be shown that the measuring cup 26 is preferably shaped so as to define a closed cylindrical container 40 having an open upper end from which a substantially rectangular cup flange 42 orthogonally projects. The cup flange 42 is preferably shaped so as to extend substantially radially outwardly from an exterior surface of the cylindrical container 40 and is aligned with an upper edge thereof such that the cup flange 42 can be slidably positioned within the flange channels 30 to abuttingly engage the valve plate 24 to effect uncovering of the dispensing aperture 22. By this structure, unintentional dispensing of the material 14 from the dispensing aperture 22 prior to positioning of the open upper end of the cylindrical container 40 therebeneath as the valve plate 24 is moved to uncover the dispensing aperture is substantially reduced.

With continuing reference to FIGS. 1 and 2, it can be shown that the container 12 desirably includes a viewing window 44 of translucent or transparent construction directed therethrough enabling an individual to visually ascertain a level of material 14 within the container. The viewing window 44 may include graduations thereon or printed adjacent thereto.

Figure 8:
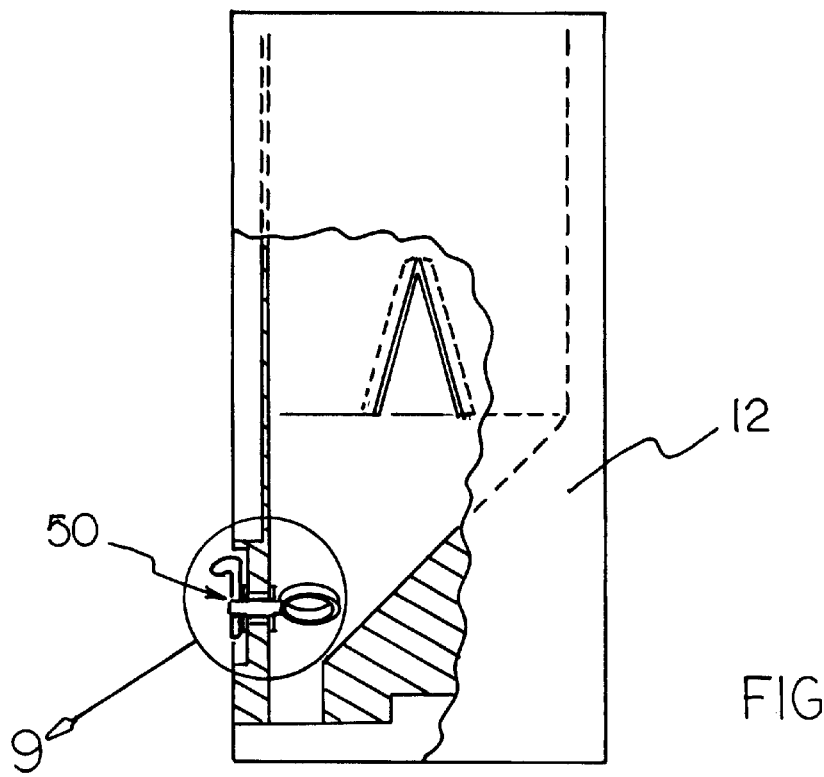
FIG. 8 is a side elevational view, partially in cross section, of the present invention including an agitator assembly.
Figure 9:
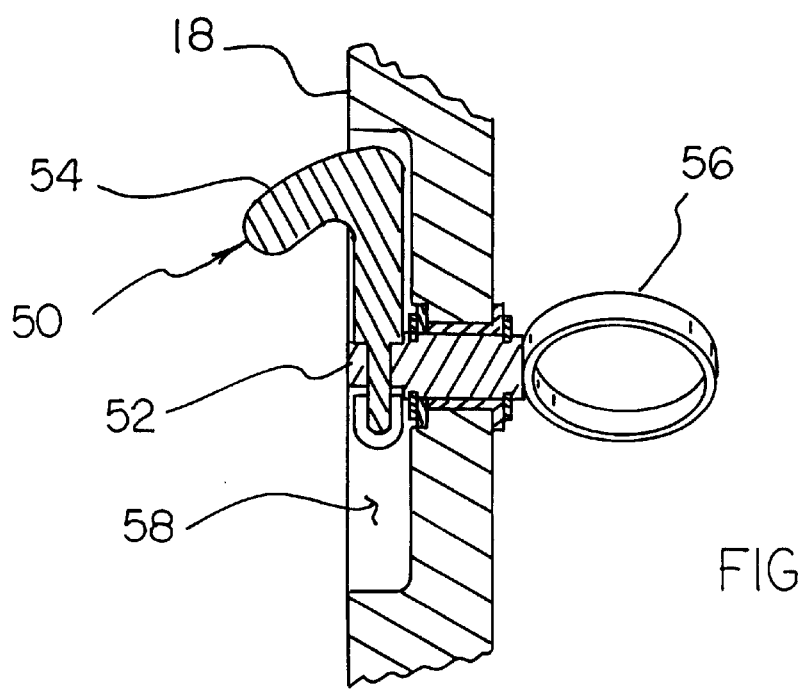
FIG. 9 is an enlarged cross sectional view of the area set forth in FIG. 8 illustrating the agitator assembly.

Referring now to FIGS. 8 and 9, it can be shown that the present invention may additionally include an agitator assembly 50 directed through the front wall 18 of the container 12 and positioned proximal to the aperture 22 thereof so as to agitate and encourage the gravitationally biased dispensing of the material 14 from the container through the aperture. As shown in FIG. 9, the agitator assembly includes an axle 52 rotatably directed through the front wall 18 of the container 12. A crank 54 is mounted to the axle 52 and can be manually rotated to effect concurrent rotation of the axle. An agitator 56, preferably in the form of a hoop, is mounted to an interior portion of the axle 52 within the container 12 and is positioned for contact with material 14 when such material is residing within the container 12. Thus, by a rotation of the crank 54, the agitator 56 will be caused to rotate to break up the material to promote ease of flowing of the material from the container through the aperture 22 thereof. If desired, the container 12 can be shaped so as to define a recess 58 directed into the front wall 18 of the container 12 within which the crank 54 at least partially resides. The crank 54 can further be rotatably coupled to the axle 52 so as to be rotatably positionable completely within the recess 58 of the front wall 18 of the container 12 for storage. To this end, the crank 54 can be rotatably coupled to the axle 52 so as to be rotatable relative to the axle about an axis directed orthogonally through an axis of rotation of the axle.

With reference to FIG. 8, it can be shown that the present invention may additionally include a blade 48 mounted onto or incorporated into the interior walls of the container 12. The inverted V-shaped blade provides a means of piercing and separating bags which contain particulate material. This action allows the filling of container 12 with the bag contents to become an easier, cleaner procedure. The use of biodegradable bags is thereby facilitated which will hopefully lead to a decline in the use of cardboard boxes.

In use, the material dispenser 10 according to the present invention can be easily utilized for supplying a predetermined amount of material into a measuring cup 26. If desired, a variety of disparately sized measuring cups 26 can be provided with the present invention 10 and can include sizes such as a quarter cup, a half cup, three quarters of a cup, and one cup sizes, or metric sizes. The present invention can be easily mounted to any desired support surface such as a vertical wall or the like utilizing mounting apertures 46 extending into the container 12 such as is illustrated in FIG. 3 of the drawings. It should be noted that the material dispenser 10 may be utilized to dispense any type of flowable or particulate materials, including fluid materials if so desired and may include any appropriate sealing means for accomplishing the same.

In an alternate embodiment 100, an agitator assembly 102 is included. Such agitator is adapted to facilitate the dispensing of any viscous or particulate material. As shown in FIG. 11, the agitator assembly includes a vertically oriented auger 104 having a first end rotatably coupled to a thin cross bar 106 situated over the dispensing aperture and a second end rotatably coupled to a top wall portion adjacent the open upper end and lid of the container. It should be noted that in the present embodiment, the lid is pivotally coupled along the top wall portion of the container. Also shown in FIG. 11 is yet another alternate embodiment wherein the auger is horizontally oriented. An L-shaped handle 108 is coupled to the second end of the auger for allowing the manual rotation thereof thus facilitating the dispensing of the material. In the alternative, a motor may be used in lieu of the handle. A pair of U-shaped rods 110 each have a first end coupled to a central extent of the auger and a second end coupled to the first and second end thereof, respectively.

Figure 27:
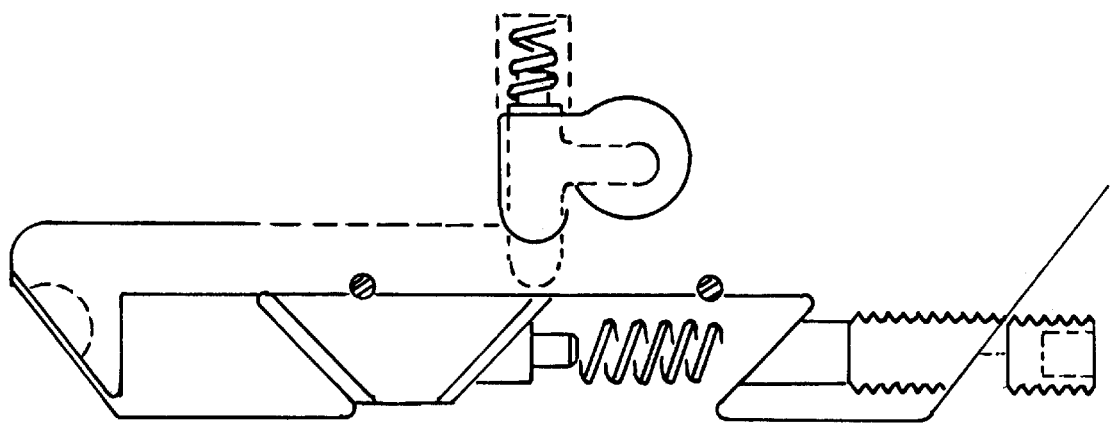
FIG. 27 shows an exploded view of a self-adjusting gibe system and, at the top thereof, a locking and locating pin for cups, valve attachments, adapters, etc.

Further included in the present alternate embodiment is a valve plate stopper 112. Such valve stopper includes a stop plate 114 slidably situated within a channel 116 formed on a side of the container at a location above the spring. A grip tab 120 is integrally coupled to a lower surface of an outboard end of the stop plate for allowing a user to manually slide the stop plate between a first orientation and a second orientation. To allow such manual sliding, the channel has a portion 121 which extends downwardly in communication with a lower surface of the container. The first orientation of the stop plate is defined by the stop plate abutting an upwardly extending flange 122 of the valve plate. In this orientation, the stop plate is adapted for maintaining the dispensing apertures open for use with the various adapters and provides a means of locking the valve plate in the open or closed position. It is imperative that the valve plate be in the open orientation prior to the stop plate being slid into the first orientation. The grip tab further allows positioning of the stop plate in a second orientation distant the valve plate and the flange thereof, thereby permitting the valve plate stopper to be opened land closed freely. Also the spring loaded pin in FIG. 27 is used to lock and locate cups, valve attachments, re-fill adapters, various funnel attachments, etc.

As shown in FIGS. 11 & 12, an O-ring 124 is formed in the container about the dispensing aperture and in communication with a top surface of the valve plate for precluding the material from leaking. Associated therewith is a sealing mechanism including a spring biased elongated tab 126 adapted to abut a side edge of the valve plate. By this structure, the sealing mechanism is adapted for urging the valve plate upwardly against the O-ring. For the sealing mechanism to function properly, it is important that the channel of the container and flanges of the valve plate constitute a dove tail recess and a pair of projections, respectively. To prevent the tab from being ejected when the valve plate is open, the length thereof is designed to ensure that it is always in communication with the valve plate. The sealing mechanism also has multiple screws 128 for compressing associated springs 129 for increasing a force in which the valve plate is urged upwardly for sealing and axially for a self-adjusting tension on the valve plate to accommodate for wear. The O-ring and sealing mechanism are critical when the dispenser is employed for the purpose of dispensing liquids.

It should be noted that, as an option, a pump may be included to provide a vacuum within the container which, in turn, preserves the material stored therein, as well as an air release plunger with lock so as to create easier removal of the lid and a freer flow of material as in FIG. 28.

In yet another alternate embodiment shown in FIG. 13 & 14, a plurality of containers are included. Each container is equipped with a pair of flanges 130 formed on opposite side faces thereof. A mounting frame 132 is also provided with a vertical plate 134 adapted to be coupled to a vertical recipient surface. Coupled to the vertical plate is a horizontal plate 136 with a plurality of grooves 138 formed therein for releasably receiving the flanges of each of the containers such that the containers are situated side-by-side.

Various alternate embodiments and options associated with the present invention will now be discussed. Such alternate embodiments and options are shown in FIGS. 15–31.

Figure 17A:
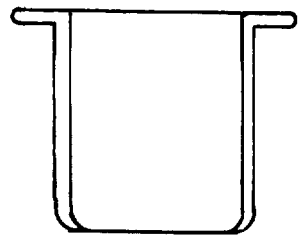
FIG. 17 illustrates a sifter.
Figure 17B:
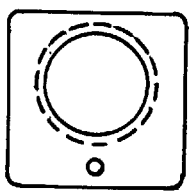
Figure 17:
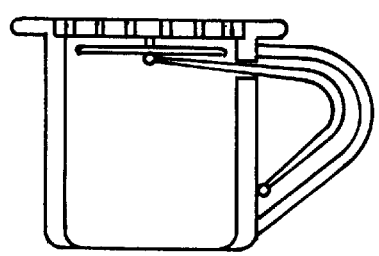
Figure 18A:
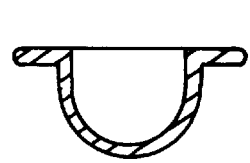
FIG. 18 shows a spoon.
Figure 18B:
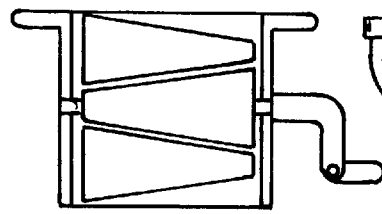
Figure 18:
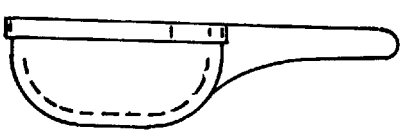
Figure 19A:
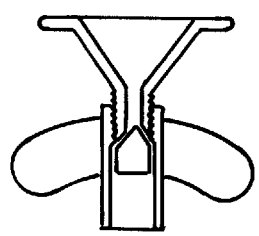
FIG. 19 shows a bucket hanger.
Figure 19B:
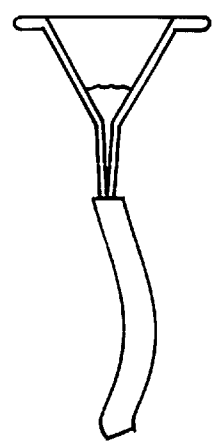
Figure 19:
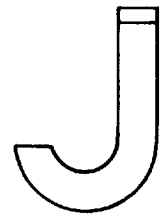
Figure 21:
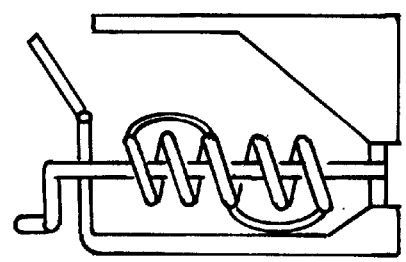
FIG. 21 is a different side view of the auger in a vertical orientation.
Figure 20:
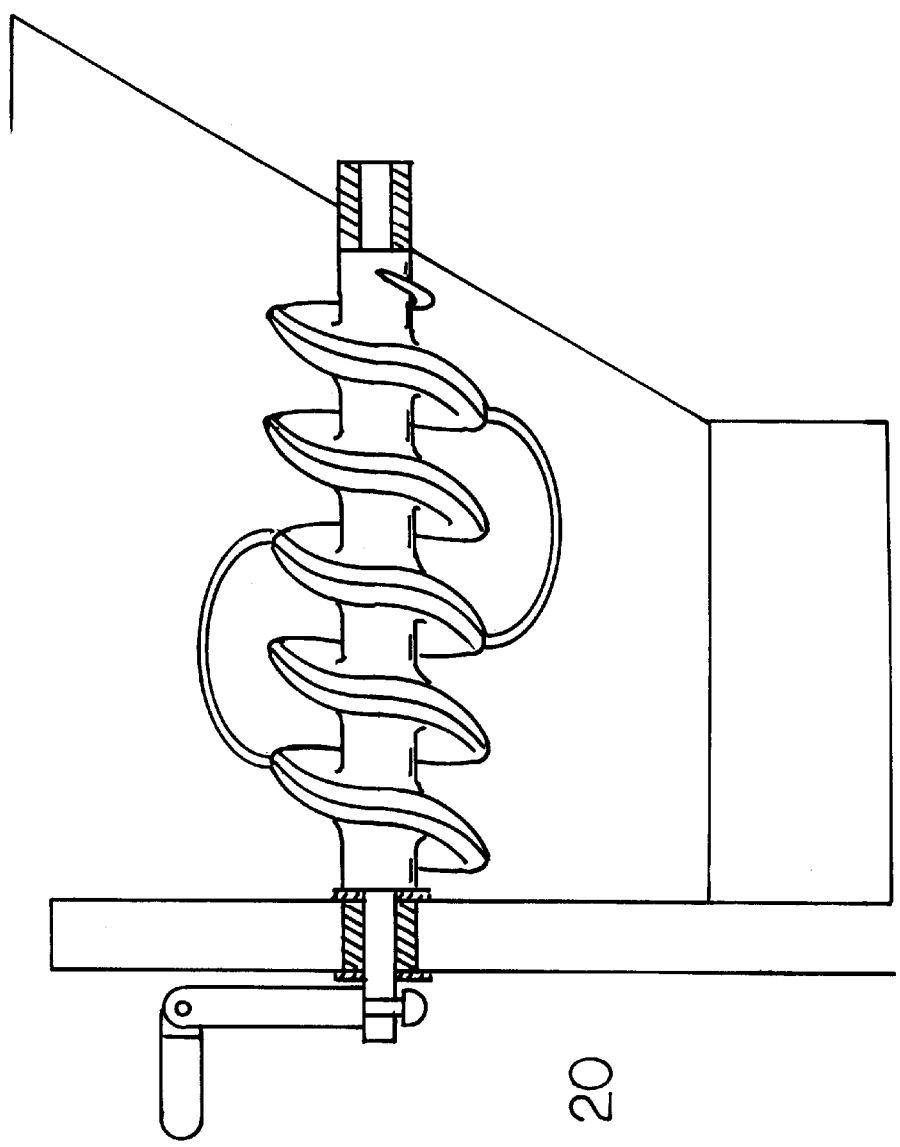
FIG. 20 is an illustration of the auger in a horizontal orientation.

FIG. 15 shows a flexible tube for directing flow from the container into various basins located at floor level. FIG. 16 is an illustration of a method of interconnecting the various containers in a side-by-side relationship for containing and dispensing various household food products and the like. FIG. 17 is an illustration of various containers and sifters that be utilized in lieu of the measuring cup 26 of the present invention. FIG. 18 depicts additional alternate embodiments of measuring cups and grinders associated with the embodiments of FIG. 17. FIG. 19 is an illustration of various funnels and a drain cock which may be used instead of the measuring cup 26 of the present invention for various tasks such as funneling material from the container 12. FIG. 20 is an illustration of the auger in a horizontal orientation as opposed to a vertical orientation as shown and described hereinabove and in FIG. 21.

Figure 22:
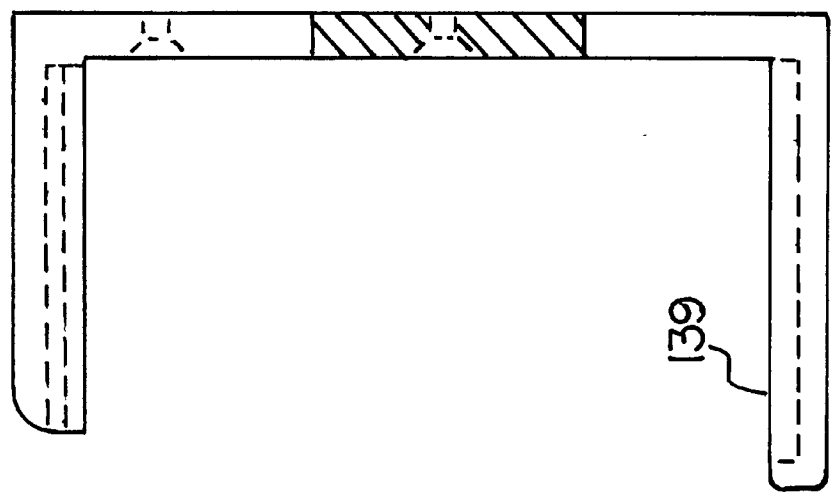
FIG. 22 is a mounting bracket with a drip tray/shelf combination.
Figure 22A:
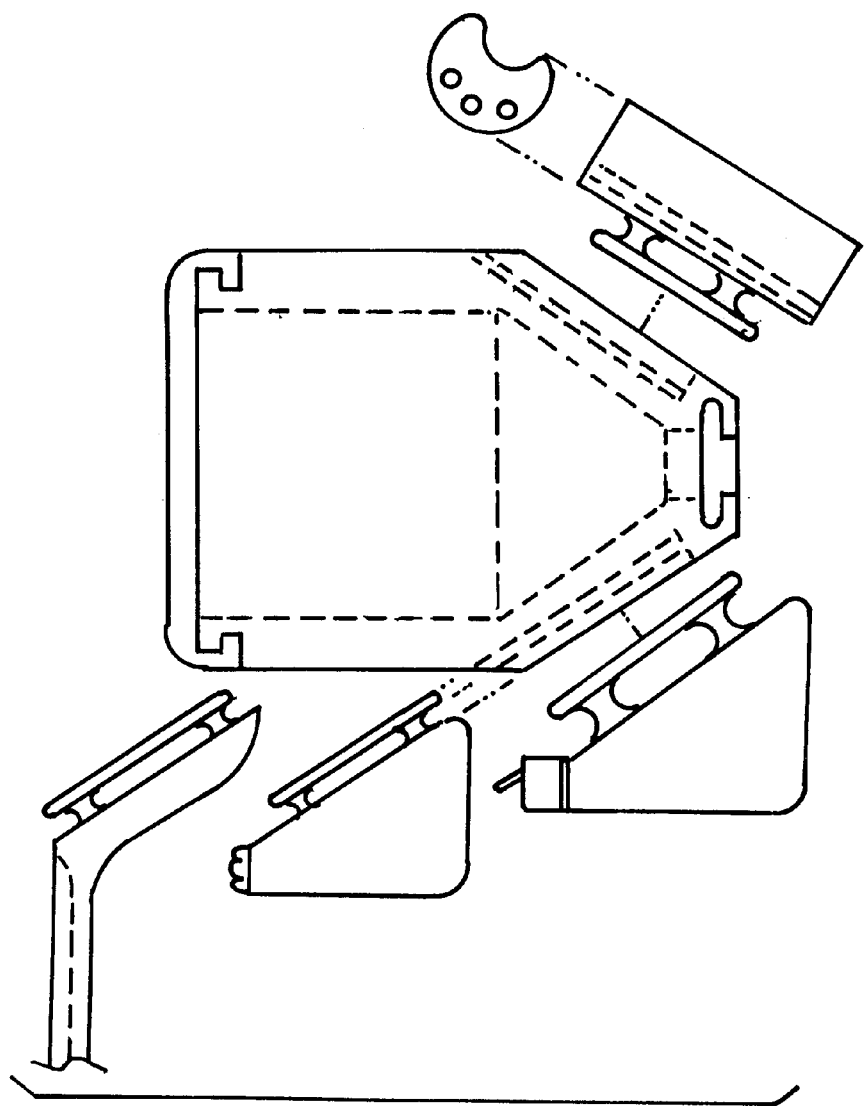
FIG. 22A displays the container of the present invention with a pair of T-shaped grooves formed on a pair of bottom angled side extents thereof. Further shown is at least one dispensing bottle with a handle which may further serve to releasably engaged with one of the grooves of the dispensing containers.

FIG. 22 displays the container 12 of the present invention with dovetail or T-shaped grooves formed on a pair of bottom angled side extents thereof. Further shown is at least one dispensing bottle with a handle which may further serve to releasably engaged with one of the grooves of the dispensing containers. Note the exploded view of FIG. 22A. Also shown in FIG. 22 is a mounting bracket with a drip tray/shelf combination drip tray 139 and shelf combination. FIG. 23 is an exploded view of various removable tops for dispensing material from the bottle of FIG. 22. Also shown in FIG. 23 is a paper towel rack, tissue holder and a salt/pepper shaker which are also equipped with a T-shaped handle for being removably coupled with the foregoing T-shaped grooves. It should be noted that these grooves provide storage recesses for several bottles, accessories, cups, adapters, valves, etc., along the full width of the container. These bottles are refillable with the use of adaptors provided, and are designed to provide maximum use of contents for minimum waste.

Figure 26A:
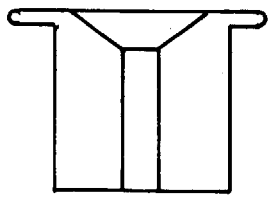
FIG. 26 shows a bottle adapter for refilling bottles.
Figure 26B:
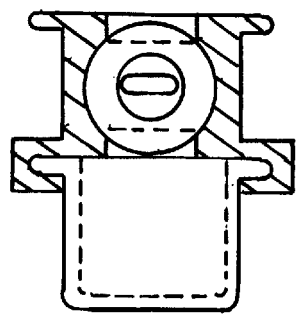
Figure 26C:
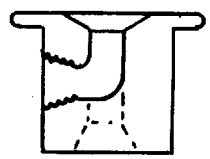
Figure 26:
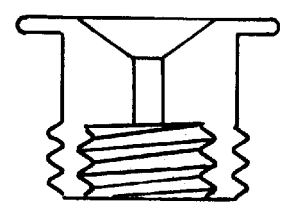

FIG. 24 shows a mounting assembly for mounting the refilleable bottles and/or extras available. Also shown is a front view of the mounted containers each which a unique dispensing assembly coupled thereto. It should be understood that such dispensing assemblies are mounted within the slot in place of the valve plate. The valve plate stopper 112 precludes the dispensing assembly from being ejected. FIG. 25 shows a plurality of examples of such dispensing assemblies. Further examples of dispensing assemblies are shown in FIG. 26. The dispensing assemblies of FIG. 26 include a reducer for low viscosity fluids, a dispenser with ball valve, threaded adapter, and the like. While the valve plate stopper precludes the valve plate from ejecting the various valve assemblies, it should be noted that a locking and locating mechanism, as shown in FIG. 27, may be further included to preclude the removal of the dispensing assemblies and cups.

Finally, FIG. 28 shows a pump for effecting a pressure within the container for the purpose of facilitating an airtight container to preserve the material therein. The pump is equipped with a particle trap and a manually-operated piston. It should be note that the pump is preferably mounted on a top of the container, where it is conveniently accessible. An air release pin, with lock, provides a means for air to enter or exit the container.

Figure 31:
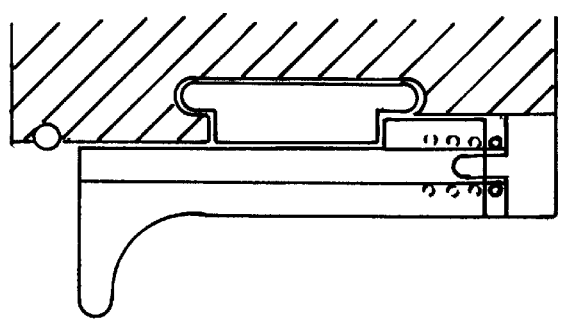
FIG. 31 is an illustration of a hand valve for small particles such as dry hand soap with a spring seat.
Figure 31A:

With regard to the drawings, FIG. 17 illustrates a sifter while FIG. 17-A shows an open cup bottom for fast filling. FIG. 17-B illustrates a locking location pin hole. FIG. 18 shows a spoon while FIG. 18-A is a sectional view of such spoon. FIG. 18-B shows a pepper grinder or bean grinder. FIG. 19 shows a bucket hanger while FIG. 19-A shows a drain cock and FIG. 19-B shows a funnel and hose. FIG. 24 is a wall-mounted accessory hanger for hanging bottles and the like. FIGS. 25, 25-A and 25-B show various viscous liquid attachments. FIG. 26 shows a bottle adapter for refilling bottles. FIG. 26-A shows a low-viscous orifice reducer. FIG. 26-B shows a ball valve with cup which can be used in conjunction with other attachments and adapters. FIG. 26-C shows a threaded adapter for use with liquid valves, pipes, hoses, etc. FIG. 27 shows an exploded view of a self-adjusting gibe system and, at the top thereof, a locking and locating pin for cups, valve attachments, adapters, etc., while in the lower left there is shown a valve plate lock. FIG. 28 shows a pump for an airtight system, FIG. 28-A a particle trap on the left side thereof, FIG. 28-B a plan view of the trap, FIGS. 28-C and D two air-release systems, while FIG. 28-E show the air-release and pump locations. FIG. 29 is a medium viscous pump and valve, a home-helper adapter, with a centrally-located opening at the top to the orifice and with a lock and locating pin hole thereadjacent and also illustrating possible handle locations. FIG. 30 shows a bag hanger adapter with spring-loaded clamps and a dovetail flange with thumb tabs while FIG. 30-A is an end view thereof. FIG. 31 is a hand valve as for small particles such as dry hand soap with a spring seat on the right. FIG. 31-A is a large particle valve as for coffee beans and the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dispenser comprising:

a container having a hollow interior within which a material can be stored, the container including a front wall and a lower surface, with a dispensing aperture directed through the lower surface of the container and into communication with an interior thereof, the container is shaped so as to define a central channel extending through the front wall thereof and along the lower surface of the container over the dispensing aperture, with the valve plate being movably mounted within the central channel over the dispensing aperture, the container is further shaped so as to define a pair of channels, with the valve plate being shaped so as to define valve plate projections which are slidably received within the flange channels of the container so as to movably mount the valve plate over the dispensing aperture;

a valve plate movably mounted to the lower surface of the container and normally positioned over the dispensing aperture so as to preclude communication therethrough;

a measuring cup adapted to be abuttingly engaged with the valve plate so as to bias the valve plate from over the dispensing aperture to permit communication from the interior of the container through the dispensing aperture and into the measuring cup, the measuring cup is shaped so as to define a closed conical container having an open upper end from which a cup projection orthogonally projects, the projections adapted to be slidably positioned within the channels to abuttingly engage the valve plate to effect uncovering of the dispensing aperture;

at least one spring mounted relative to the container and engaging the valve plate so as to position the valve plate over the dispensing aperture;

a lid pivotally coupled to an open upper end of the container;

an agitator assembly including a vertically oriented auger having a first end rotatably coupled to a cross bar situated over the dispensing aperture and a second end rotatably coupled to a top wall portion adjacent the open upper end of the container, an L-shaped handle coupled to the second end of the auger for allowing the manual rotation thereof thus facilitating the dispensing of the material, and a pair of U-shaped rods each having a first end coupled to a central extent of the auger and a second end coupled to the first and second end of the auger, respectively;

a valve plate stopper including a stop plate slidably situated within a channel formed on a side of the container at a location above the spring, a grip tab integrally coupled to a lower surface of an outboard end of the stop plate for allowing a user to manually slide the stop plate between a first orientation with the stop plate abutting an upwardly extending flange of the valve plate for maintaining the dispensing apertures open and a second orientation with the stop plate maintained distant the valve plate and the flange thereof thereby permitting the valve plate stopper to be opened and closed freely;

an O-ring formed in the container about the dispensing aperture and in communication with a top surface of the valve plate for precluding the material from leaking; and a sealing mechanism including a spring biased elongated tab adapted to abut a side edge of the valve plate for urging the valve plate upwardly against the O-ring, the sealing mechanism also having at least one screw for compressing an associated spring for increasing a force in which the valve plate is urged upwardly.

2. A dispenser comprising:

a container having a hollow interior within which a material can be positioned, the container including a front wall and a lower surface, with a dispensing aperture directed through the lower surface of the container and into communication with an interior thereof;

a valve plate movably mounted to the lower surface of the container and normally positioned over the dispensing aperture so as to preclude communication therethrough;

a measuring cup adapted to be abuttingly engaged with the valve plate so as to bias the valve plate from over the dispensing aperture to permit communication from the interior of the container through the dispensing aperture and into the measuring cup;

an agitator assembly situated within the container for facilitating the dispensing of the material, wherein the agitator assembly comprises an auger;

at least one U-shaped rod fixedly coupled to the auger so as to rotate about an axis common with the auger; and a plurality of containers each with a pair of flanges formed on opposite side faces thereof and a mounting frame with a horizontal plate having a plurality of grooves formed therein for releasably receiving the flanges of each of the containers such the containers are situated side-by-side.

3. The dispenser of claim 2, and further including a valve plate stopper for being manual slid between a first orientation with a stop plate abutting the valve plate for maintaining the dispensing apertures open and a second orientation for permitting the valve plate stopper to be opened and closed freely.

4. The dispenser of claim 2, and further including a gasket formed in the container about the dispensing aperture and in communication with a top surface of the valve plate for precluding the material from leaking.

5. A dispenser comprising:

a container having a hollow interior within which a material can be positioned, the container including a front wall and a lower surface, with a dispensing aperture directed through the lower surface of the container and into communication with an interior thereof;

a valve plate movably mounted to the lower surface of the container and normally positioned over the dispensing aperture so as to preclude communication therethrough;

a measuring cup adapted to be abuttingly engaged with the valve plate so as to bias the valve plate from over the dispensing aperture to permit communication from the interior of the container through the dispensing aperture and into the measuring cup;

an agitator assembly situated within the container for facilitating the dispensing of the material;

a sealing mechanism including a spring biased elongated tab and at least one set screw adapted to abut the valve plate for urging the valve plate upwardly against the gasket.

6. A dispenser as set forth in claim 5 wherein a pump is included for generating a vacuum within the container.

* * * * *